(12) United States Patent
Rummel et al.

(10) Patent No.: US 10,159,380 B2
(45) Date of Patent: Dec. 25, 2018

(54) CROSS-FLAME BURNER SYSTEM

(71) Applicants: Randy Rummel, Huntington Beach, CA (US); Daniel Nichols, Huntington Beach, CA (US); Mark Steinman, Huntington Beach, CA (US)

(72) Inventors: Randy Rummel, Huntington Beach, CA (US); Daniel Nichols, Huntington Beach, CA (US); Mark Steinman, Huntington Beach, CA (US)

(*) Notice: Subject to any disclaimer, the term of this patent is extended or adjusted under 35 U.S.C. 154(b) by 425 days.

(21) Appl. No.: 14/967,136

(22) Filed: Dec. 11, 2015

(65) Prior Publication Data

US 2017/0167723 A1 Jun. 15, 2017

(51) Int. Cl.

| | |
|---|---|
| F23D 23/00 | (2006.01) |
| F23D 14/14 | (2006.01) |
| F23D 14/10 | (2006.01) |
| F23D 14/12 | (2006.01) |
| A47J 37/07 | (2006.01) |
| F23D 14/02 | (2006.01) |

(52) U.S. Cl.
CPC .......... *A47J 37/0713* (2013.01); *F23D 14/02* (2013.01); *F23D 14/10* (2013.01); *F23D 14/12* (2013.01); *F23D 14/14* (2013.01); *F23D 23/00* (2013.01); *F23D 2900/14041* (2013.01)

(58) Field of Classification Search
CPC .......... F23D 14/10; F23D 14/14; F23D 14/76; F23D 23/00; F22D 2900/14041; A47J 37/0713
See application file for complete search history.

(56) References Cited

U.S. PATENT DOCUMENTS

| | | | | |
|---|---|---|---|---|
| 4,677,964 | A * | 7/1987 | Lohmeyer | A47J 37/0713 126/41 R |
| 5,127,824 | A * | 7/1992 | Barker | A47J 37/0713 126/41 R |
| 5,617,778 | A * | 4/1997 | Schroeter | A47J 37/0713 126/25 R |
| 6,102,029 | A * | 8/2000 | Stephen | A47J 37/0713 126/41 R |
| 6,699,036 | B2 * | 3/2004 | Schlosser | F23D 14/10 126/39 R |
| 6,705,307 | B2 * | 3/2004 | Alden | A47J 37/0713 126/41 R |
| 9,901,211 | B2 * | 2/2018 | Balcerzak | A47J 37/0786 |
| 2005/0098168 | A1 * | 5/2005 | Williams | A47J 37/0713 126/25 R |

* cited by examiner

*Primary Examiner* — David J Laux
(74) *Attorney, Agent, or Firm* — John D. Tran; Rhema Law Group

(57) ABSTRACT

A method and system can include: providing a grill body; mounting a cross-flame burner within the grill body, the cross-flame burner including an arched extension, a longitudinal portion, and a gas conduit, the arched extension extending laterally from the longitudinal section, the cross-flame burner including burner ports within the arched extension for providing a flame from a fuel and air mixture from the gas conduit; and affixing a Venturi body to the gas conduit.

20 Claims, 5 Drawing Sheets

CROSS-FLAME BURNER SYSTEM

TECHNICAL FIELD

This disclosure relates to grilling technology, more particularly grilling technology implementing cross-flame burners and radiant heating.

BACKGROUND

A common method of cooking foods is grilling which is also known as barbecuing or under-fired broiling. Under-fired broiling refers to the placement of the heat source beneath the foods being cooked where it is common to design a gas burner that is designed to provide heat to some sort of radiant design that then conducts the heat from the burner flames into radiant heat. That radiant heat is transmitted mostly vertically towards a metal grid, or grill rack that is employed to support the foods being cooked.

These burner, radiant and grill rack assemblies are typically enclosed next to each other in multiple sections into a metal housing that comprise the grilling appliance. Most of these grilling appliances have hinged covers that can be opened and closed over the grilling sections, some are built without any lids or covers.

These appliances are commonly used for residential or commercial restaurant use and can be used in an indoor or outdoor area. These appliances appliance are intended for the cooking of foods such as meats and vegetables using natural gas or propane.

In the development of under-fired broiling appliances, many problems have arisen degrading the functionality, safety, and effective cooking properties of these appliances.

One problem that has arisen is evident as foods are cooked on the cooking grid above the heat source, combustible oils and juices are cooked out of the foods and can drain downward onto the burner. When the burner is unprotected these oils have a tendency of blocking the flame ports of the burner on their path downward to the grease receptacle or tray.

A secondary problem to draining combustible oils arises if the combustible oils puddle or collect on a radiant surface then they can subsequently ignite on the hot radiant surfaces and create uncontrolled flare-ups that can burn and overcook the food's exterior and either ruin the food from excessive charring, or compel the operator to remove the food thinking it has reached a safe internal food temperature. Often times the food is not cooked thoroughly.

A further problem that has arisen with under-fired broiling appliances is how even the burners flames are distributed across the grilling surface. Most grill burners do not evenly populate the grill area with heat from the burners, typically the heat is concentrated in sections of the grilling area resulting in hot and cold spots.

Solutions to these problems have been long sought but prior developments have not taught or suggested any complete solutions, and solutions to these problems have long eluded those skilled in the art. Thus there remains a considerable need for devices and methods providing safer and more effective under-fired broiling.

SUMMARY

A cross-flame burner system and methods, providing significantly safer and effective under-fired broiling, are disclosed. The cross-flame burner system and methods can include: providing a grill body; mounting a cross-flame burner within the grill body, the cross-flame burner including an arched extension, a longitudinal portion, and a gas conduit, the arched extension extending laterally from the longitudinal section, the cross-flame burner including burner ports within the arched extension for providing a flame from a fuel and air mixture from the gas conduit; and affixing a Venturi body to the gas conduit.

Accordingly it has been discovered that one or more embodiments described herein can protect burner ports from blockage by falling debris with a specially designed radiant tray, placed above the burner ports located on cross-flame tubes.

It has been further discovered that one or more embodiments described herein can minimize uncontrolled flare-ups by eliminating flat areas on the radiant tray so grease and oils are not permitted to collect or puddle up and ignite to create flare-ups.

It has been further discovered that one or more embodiments described herein can evenly distribute the burner flames across the grill surface while solving the problem of secondary air supply to the burner flames through use of cross-flame tubes. Further the cross-flame tubes and gas ways allow secondary air to penetrate the gas flames from both sides enhancing combustion characteristics.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The cross-flame burner system is illustrated in the figures of the accompanying drawings which are meant to be exemplary and not limiting, in which like reference numerals are intended to refer to like components, and in which.

DETAILED DESCRIPTION

Figure 1:
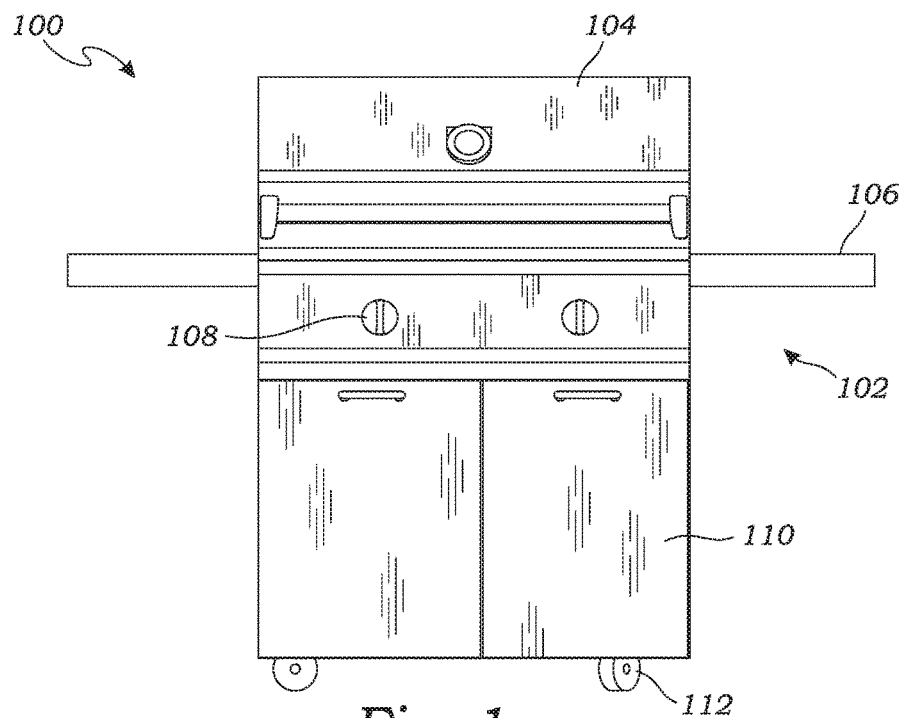
FIG. 1 is a side view of a cross-flame burner system in a first embodiment.

In the following description, reference is made to the accompanying drawings that form a part hereof, and in which are shown by way of illustration, embodiments in which the cross-flame burner system may be practiced. It is to be understood that other embodiments may be utilized and structural changes may be made without departing from the scope of the cross-flame burner system.

When features, aspects, or embodiments of the cross-flame burner system are described in terms of steps of a process, an operation, a control flow, or a flow chart, it is to be understood that the steps can be combined, performed in a different order, deleted, or include additional steps without departing from the cross-flame burner system as described herein.

The cross-flame burner system is described in sufficient detail to enable those skilled in the art to make and use the cross-flame burner system and provide numerous specific details to give a thorough understanding of the cross-flame burner system; however, it will be apparent that the cross-flame burner system may be practiced without these specific details.

In order to avoid obscuring the cross-flame burner system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the cross-flame burner system can be operated in any orientation.

As used herein, the term system is defined as a device or method depending on the context in which it is used. For expository purposes, the term "horizontal" as used herein is defined as a plane parallel to the top plane or surface of the grating in a high or elevated position, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

Referring now to FIG. 1, therein is shown a side view of a cross-flame burner system 100 in a first embodiment. The cross-flame burner system 100 is depicted having a body 102 with a hood covering 104 coupled thereto. The hood covering can be moveable and can hinge to provide access inside the cross-flame burner system 100.

Beside the hood 104 and extending out from the body 102 are food preparation extensions 106. Below the hood 104, the body is depicted as having knobs 108 for controlling the heat of the cross-flame burner system 100.

The body 102 can further include doors 110 allowing access to the cooking gas and storage. The cross-flame burner system 100 can include wheels 112 for convenient repositioning.

Figure 2:
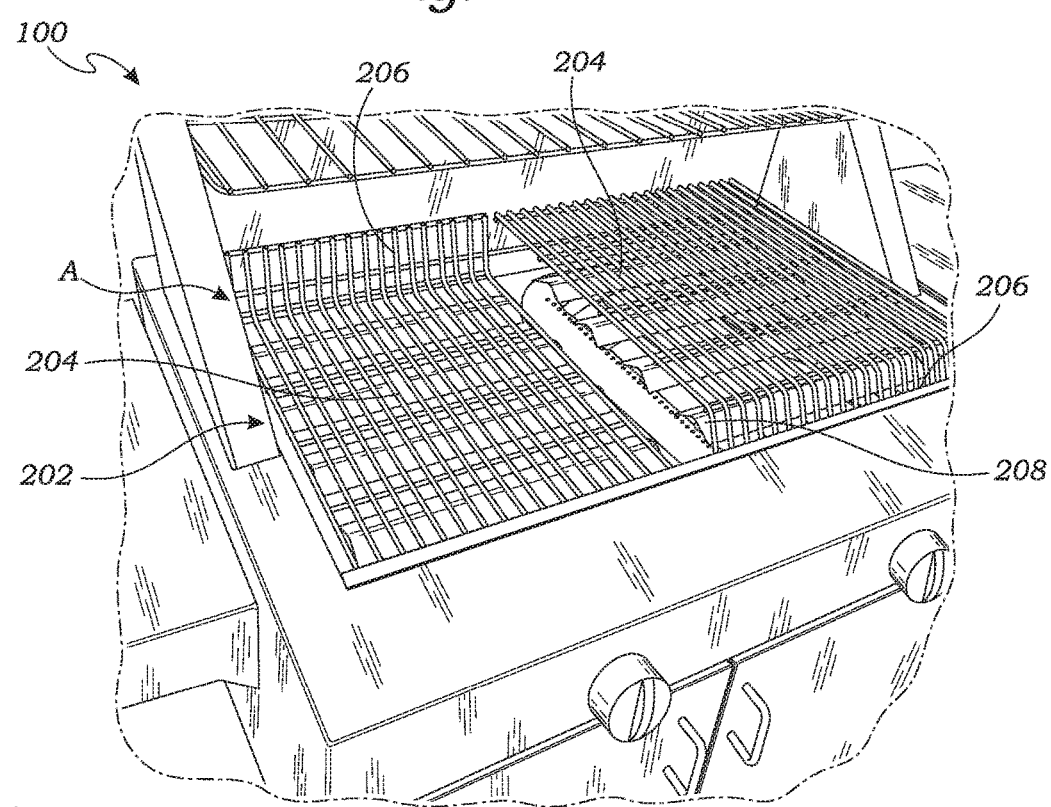
FIG. 2 is an isometric view of the cross-flame burner system of FIG. 1 in an open configuration.

Referring now to FIG. 2, therein is shown an isometric view of the cross-flame burner system 100 of FIG. 1 in an open configuration. The hood 104 of FIG. 1 is in the open position revealing grating 202. The grating 202 is shown having an L shape with a longitudinal surface 204 formed integrally with a vertical surface 206. It is contemplated that either side of the longitudinal surface 204 can be used to cook food.

In the current configuration, the grating 202 on the right side of the cross-flame burner system 100 is shown having the vertical surface 206 extending up from the longitudinal surface 204. Depicting another configuration, the right side of the cross-flame burner system shows the grating 202 flipped over to place the vertical surface 206 near the knob 108 and allow the vertical surface 206 to extend down from the longitudinal surface 204.

In this way the grating 202 is able to be raised and lowered in a very simple and effective way. When the vertical surface 206 is facing up, the longitudinal surface 204 is nearer radiant trays 208 and the heat radiating therefrom. When the vertical surface 206 is facing down, the longitudinal surface 204 is further from the radiant trays 208 and the heat radiating therefrom.

Figure 3:
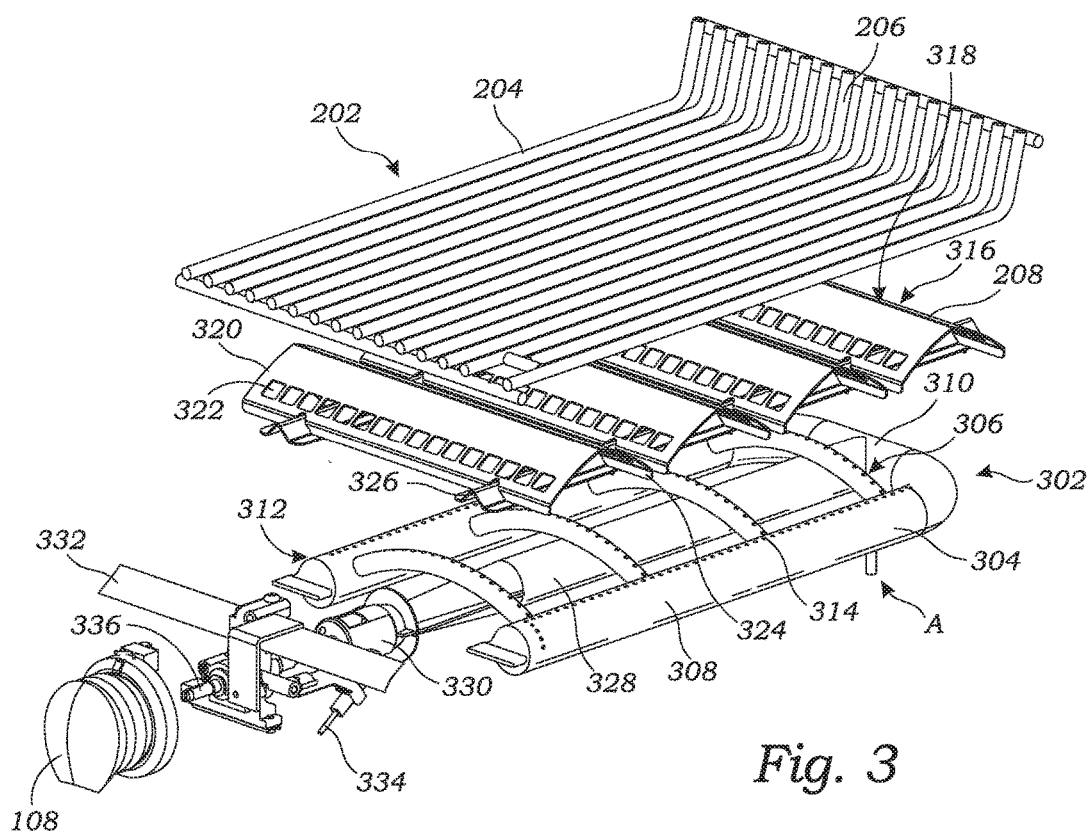
FIG. 3 is an exploded isometric view of area A of FIG. 2.

Referring now to FIG. 3, therein is shown an exploded isometric view of area A of FIG. 2. Area A depicts a cross-flame burner 302 including a burner body 304 and horizontal extensions 306. For expository purposes, the elements "horizontal extensions 306", are to be understood as synonymous to, and interchangeable with, "arched extensions".

The horizontal extensions 306 extend from longitudinal portions 308 of the burner body 304. The burner body 304 can further include an end portion 310 coupling the longitudinal portions 308.

Along top surfaces 312 of the longitudinal portions 308 and the horizontal extensions 306 are burner ports 314. The burner ports 314 can be directed upward and can project a flame upward towards the radiant trays 208.

The top surfaces 312 of the longitudinal portions 308 and the horizontal extensions 306 are depicted as a curved surface which has been discovered to reduce manufacturing costs. Further the horizontal extensions 306 are depicted having a cross-sectional area less than that of the longitudinal portions 308 for improved gas distribution and flow within the cross-flame burner 302.

The radiant trays 208 are depicted having an inverted V configuration. The radiant trays 208 are depicted with an apex 318 of the radiant trays 208 centered between legs 320 of the radiant trays 208.

Other contemplated configurations could include a soft apex 318 where the radiant trays 208 are more similar to an inverted U, or configurations where the apex 318 is off center between the legs 320. In the current exemplary embodiment, the horizontal extensions 306 are shown curving up toward the radiant trays 208 between the longitudinal portions 308 of the burner body 304. The horizontal extensions 306 can extend out of the longitudinal portions 308 from below the top surfaces 312 of the longitudinal portions 308.

It has been discovered that the shape of the radiant trays 208 and the positioning of the radiant trays 208 above the cross-flame burner 302 and specifically the positioning of the radiant trays 208 above the horizontal extensions 306 of the cross-flame burner 302 provide multiple advantages.

One advantage unexpectedly discovered is that as the cross-flame burner 302 projects a flame upward toward the radiant trays 208, the radiant trays 208 will conduct the heat from the flame and evenly re-radiate the thermal energy orthogonally to the surface of the legs 320. Radiating evenly distributed the thermal energy in this way creates areas of evenly distributed overlapping thermal energy above the radiant trays 208 that increase the effectiveness of the cross-flame burner 302 during food preparation by eliminating hot and cold spots while requiring a minimal number of the burner ports 314.

Another advantage unexpectedly discovered is that the angle of the legs 320 and the small surface area of the apex 318 allow oils and grease from food (not shown) to drip down the legs 320 without pooling or collecting on the radiant trays 208. This eliminates flareups from the oils and grease catching fire.

The legs 320 are shown to include secondary air ports 322. The secondary air ports 322 are depicted as distributed above edge extensions 324. The edge extensions 324 extend from the bottom of the legs 320.

The secondary air ports 322 in the legs 320 of the radiant trays 208 can allow air to mix with the flames emitted from the burner ports 314 and provide a cleaner, more thorough, and more even burn of the cooking gas. The edge extensions 324 can extend down from the legs 320 providing a standoff height in addition to the vertical height of the radiant trays 208 above the horizontal extensions 306.

The edge extensions 324 can contact longitudinal radiant trays 326. The longitudinal radiant trays 326 can extend between the radiant trays 208 and support the radiant trays 208. The longitudinal radiant trays 326 can be positioned over the longitudinal portions 308 of the burner body 304.

The edge extensions 324 of the radiant trays 208 can extend into the longitudinal radiant trays 326 and be anchored within the longitudinal radiant trays 326. The longitudinal radiant trays 326 can have an inverted V shape similar to the radiant trays 208 and can operate in much the same way absorbing and re-radiating thermal energy.

The longitudinal radiant trays 326 can extend above and fully cover the longitudinal portions 308 while the radiant trays 208 can extend above and fully cover the horizontal extensions 306. The radiant trays 208 can extend horizontally beyond the longitudinal radiant trays 326 while the longitudinal radiant trays 326 can extend longitudinally beyond the radiant trays 208.

The end portion 310 of the burner body 304 is shown to have a gas conduit 328 extending longitudinally therefrom. The gas conduit 328 can extend between and parallel to the longitudinal portions 308 of the burner body 304. The gas conduit 328 can extend beneath the horizontal extensions 306. The horizontal extensions 308 are depicted as extended in a curve vertically up over the gas conduit 328.

The gas conduit 328 can transport cooking gas mixed with air into the burner body 304. The gas conduit 328 is shown connected to a Venturi body 330. The Venturi body 330 can mix incoming cooking gas from a gas manifold 332 with air to provide a fuel air mixture to the burner body 304.

The fuel air mixture passing through the gas conduit 328 into the cross-flame burner 302 can be ignited with an igniter 334. The amount of the gas can be controlled by a valve 336 connected to the knob 108.

Above the radiant trays 208 and the cross-flame burner 302 is the grating 202. The grating 202 is shown having an L shape with the longitudinal surface 204 formed integrally with the vertical surface 206. It is contemplated that either side of the longitudinal surface 204 can be used to cook food.

In the current configuration, the grating 202 is shown having the vertical surface 206 extending up from the longitudinal surface 204 near the end portion 310 of the cross-flame burner 302. In other configurations it is contemplated that the grating 202 can be flipped over to place the vertical surface 206 near the knob 108 and allow the vertical surface 206 to extend down from the longitudinal surface 204.

In this way the grating 202 is able to be raised and lowered in a very simple and effective way. When the vertical surface 206 is facing up, the longitudinal surface 204 is nearer the radiant trays 208 and the heat radiating therefrom. When the vertical surface 206 is facing down, the longitudinal surface 204 is further from the radiant trays 208 and the heat radiating therefrom.

Figure 4:
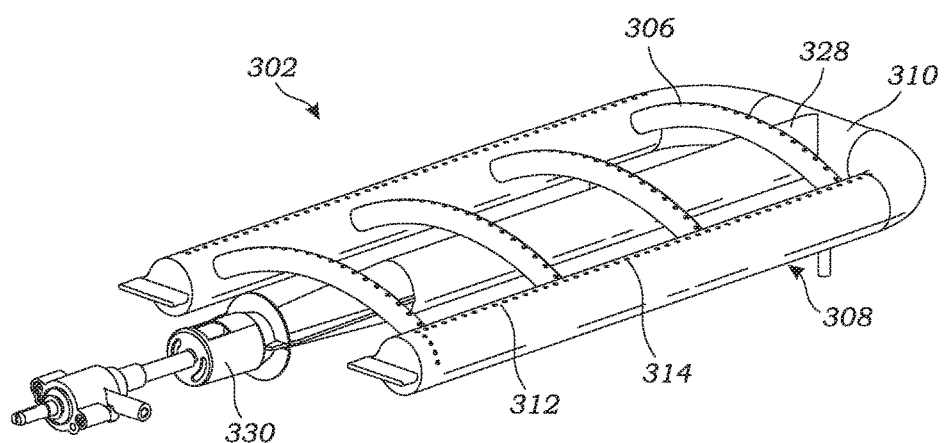
FIG. 4 is an isometric view of the cross-flame burner of FIG. 3.

Referring now to FIG. 4, therein is shown an isometric view of the cross-flame burner 302 of FIG. 3. The cross-flame burner 302 is shown having the longitudinal portions 308 connected with the end portion 310 and connected with the horizontal extensions 306.

The burner ports 314 are shown in the top surfaces 312 of the horizontal extensions 306 and the longitudinal portions 308 but not the end portion 310. The gas conduit 328 can be seen extending from the end portion 310 under the horizontal extensions 306 and parallel to the longitudinal portions 308 terminating at the Venturi body 330.

Figure 5:
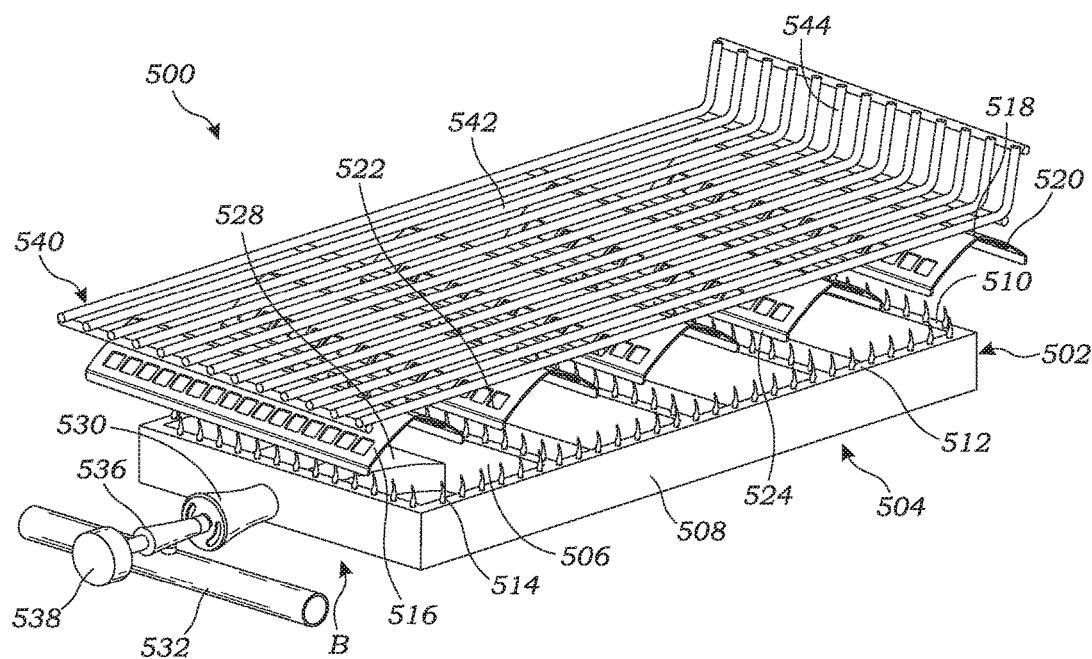
FIG. 5 is an exploded isometric view of a cross-flame burner system in a second embodiment.

Referring now to FIG. 5, therein is shown an exploded isometric view of a cross-flame burner system 500 in a second embodiment. The cross-flame burner system 500 is shown having a cross-flame burner 502 including a burner body 504 and horizontal extensions 506.

The horizontal extensions 506 extend from longitudinal portions 508 of the burner body 504. Along top surfaces 512 of the longitudinal portions 508 and the horizontal extensions 506 are burner ports 514. The burner ports 514 can be directed upward and can project a flame upward towards radiant trays 516.

The top surfaces 512 of the longitudinal portions 508 and the horizontal extensions 506 are depicted as a flat surface. Further the horizontal extensions 506 are depicted having a cross-sectional area similar to that of the longitudinal portions 508 for even distribution of cooking gas within the cross-flame burner 502.

The radiant trays 516 are depicted having an inverted V configuration. The radiant trays 516 are depicted with an apex 518 of the radiant trays 516 centered between legs 520 of the radiant trays 516.

Other contemplated configurations could include a soft apex 518 where the radiant trays 516 are more similar to an inverted U, or configurations where the apex 518 is off center between the legs 520. In the current exemplary embodiment, the horizontal extensions 506 are shown extending flatly across between the longitudinal portions 508 of the burner body 504. The horizontal extensions 506 can extend out of the longitudinal portions 508 from below the top surfaces 512 of the longitudinal portions 508.

It has been discovered that the shape of the radiant trays 516 and the positioning of the radiant trays 516 above the cross-flame burner 502 and specifically the positioning of the radiant trays 516 above the horizontal extensions 506 of the cross-flame burner 502 provide multiple advantages.

One advantage unexpectedly discovered is that as the cross-flame burner 502 projects a flame upward toward the radiant trays 516, the radiant trays 516 will conduct the heat from the flame and evenly re-radiate the thermal energy orthogonally to the surface of the legs 520. Radiating evenly distributed the thermal energy in this way creates areas of evenly distributed overlapping thermal energy above the radiant trays 516 that increase the effectiveness of the cross-flame burner 502 during food preparation by eliminating hot and cold spots while requiring a minimal number of the burner ports 514.

Another advantage unexpectedly discovered is that the angle of the legs 520 and the small surface area of the apex 518 allow oils and grease from food (not shown) to drip down the legs 520 without pooling or collecting on the radiant trays 516. This eliminates flareups from the oils and grease catching fire.

The legs 520 are shown to include secondary air ports 522. The secondary air ports 522 are depicted as distributed above edge extensions 524. The edge extensions 524 extend from the bottom of the legs 520.

The secondary air ports 522 in the legs 520 of the radiant trays 516 can allow air to mix with the flames emitted from the burner ports 514 and provide a cleaner, more thorough, and more even burn of the cooking gas. The edge extensions 524 can extend down from the legs 520 providing a standoff height in addition to the vertical height of the radiant trays 516 above the horizontal extensions 506.

The radiant trays 516 can extend above and fully cover the horizontal extensions 506. One of the horizontal extensions 506 of the burner body 504 is shown to have a gas conduit 528 extending longitudinally therefrom. The gas conduit 528 can extend between and parallel to the longitudinal portions 508 of the burner body 504. The gas conduit 528 can extend through the horizontal extensions 506.

The gas conduit 528 can transport cooking gas mixed with air into the burner body 504. The gas conduit 528 is shown connected to a Venturi body 530. The Venturi body 530 can mix incoming cooking gas from a gas manifold 532 with air to provide a fuel air mixture to the burner body 504. The amount of the gas can be controlled by a valve 536 connected to a knob 538.

Above the radiant trays 516 and the cross-flame burner 502 is a grating 540. The grating 540 is shown having an L shape with a longitudinal surface 542 formed integrally with a vertical surface 544. It is contemplated that the longitudinal surface 542 can be used to cook food on either side.

In the current configuration, the grating 540 is shown having the vertical surface 544 extending up from the longitudinal surface 542. In other configurations it is contemplated that the grating 540 can be flipped over to place the vertical surface 544 near the knob 538 and allow the vertical surface 544 to extend down from the longitudinal surface 542.

In this way the grating 540 is able to be raised and lowered in a very simple and effective way. When the vertical surface 544 is facing up, the longitudinal surface 542 is nearer the radiant trays 516 and the heat radiating therefrom. When the vertical surface 544 is facing down, the longitudinal surface 542 is further from the radiant trays 516 and the heat radiating therefrom.

Figure 6:
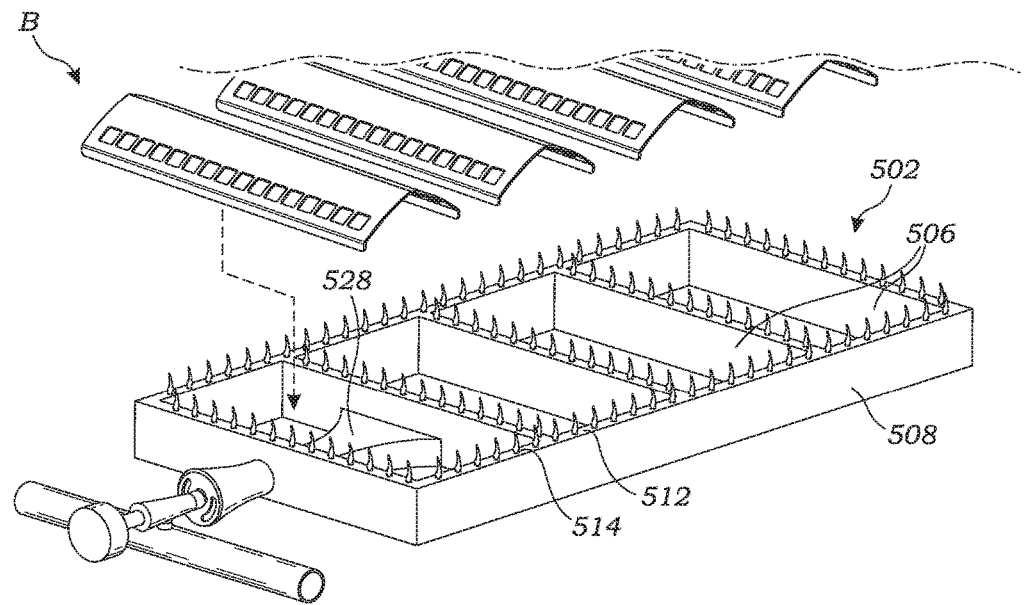
FIG. 6 is an exploded isometric view of area B of FIG. 5.

Referring now to FIG. 6, therein is shown an exploded isometric view of area B of FIG. 5. The full cross-flame burner 502 can be seen having the longitudinal portions 508 having the horizontal extensions 506 extending therebetween.

The horizontal extensions 506 are depicted as similar in height to the longitudinal portions 508. The gas conduit 528 is shown connected to one of the front horizontal extensions 506 and extending through the front horizontal extensions 506.

The gas conduit 528 is shown to be curved in a concave shape to enhance the flow of the gas and air therethrough. The gas conduit 528 curves out toward the longitudinal portions 508. The top surfaces 512 of the horizontal extensions 506 and the longitudinal portions 508 are shown having the burner ports 514 evenly spaced thereon.

The cross-flame burner 502 is shown having the longitudinal portions 508 and the horizontal extensions 506 with a gentle or slight curve near the middle of the horizontal extensions 506 and longitudinal portions 508 while the top surfaces 512 are depicted as flat.

Figure 7:
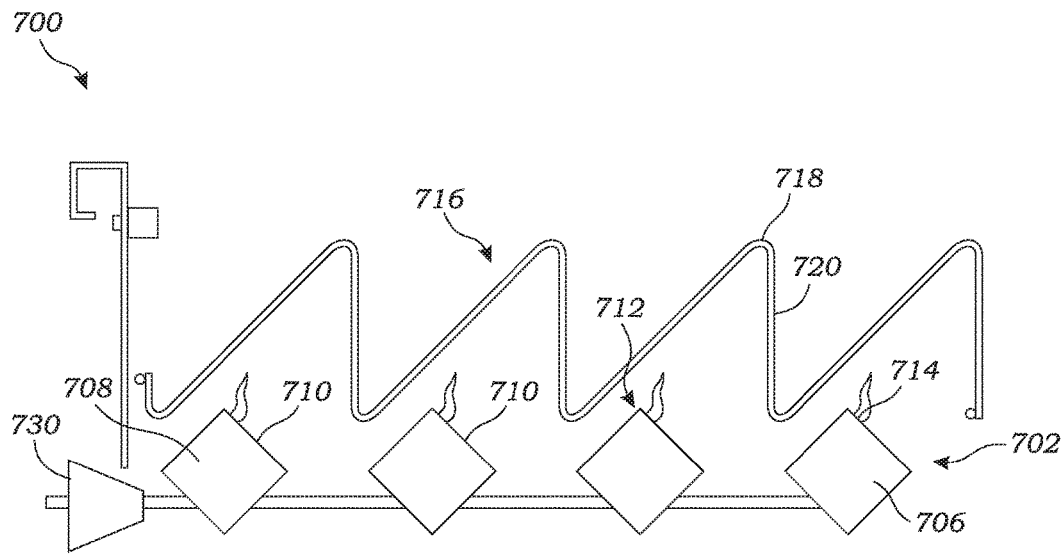
FIG. 7 is a side view of a cross-flame burner system in a third embodiment.

Referring now to FIG. 7, therein is shown a side view of a cross-flame burner system 700 in a third embodiment. The cross-flame burner system 700 is depicted to include a cross-flame burner 702 including horizontal extensions 706.

The horizontal extensions 706 are depicted having a diamond cross-section 708 with angled walls 710. Along top surfaces 712 of the angled walls 710 of the horizontal extensions 706 are burner ports 714. The burner ports 714 can be directed upward at an angle and can project a flame upward at an angle towards radiant trays 716.

The top surfaces 712 of the horizontal extensions 706 are depicted with the angled walls 710 which has been discovered to better shed grease and oils from the food (not shown) and keep the burner ports 714 clean and unobstructed by grease and oils. The radiant trays 716 are depicted having an inverted V configuration. The radiant trays 716 are depicted with an apex 718 of the radiant trays 716 offset between legs 720 of the radiant trays 716.

The angle of the legs 720 can be seen to follow the angle of the flames emitted from the burner ports 714 for a more even conduction of heat from the burner ports 714 to the radiant trays 716.

It has been discovered that the shape of the radiant trays 716 and the positioning of the radiant trays 716 above the cross-flame burner 702 and specifically the positioning of the radiant trays 716 above the horizontal extensions 706 of the cross-flame burner 702 provide multiple advantages.

One advantage unexpectedly discovered is that as the cross-flame burner 702 projects a flame upward toward the radiant trays 716, the radiant trays 716 will conduct the heat from the flame and evenly re-radiate the thermal energy orthogonally to the surface of the legs 720. Radiating evenly distributed the thermal energy in this way creates areas of evenly distributed and directional thermal energy above the radiant trays 716 that increase the effectiveness of the cross-flame burner 702 during food preparation by eliminating hot and cold spots while requiring a minimal number of the burner ports 714.

Another advantage unexpectedly discovered is that the angle of the legs 720 and the small surface area of the apex 718 allow oils and grease from food to drip down the legs 720 without pooling or collecting on the radiant trays 716. This eliminates flareups from the oils and grease catching fire.

A gas conduit 728 is depicted extending longitudinally through lower portions of the horizontal extensions 706. The gas conduit 728 can extend perpendicularly thorough the horizontal extensions 706. The gas conduit 728 can transport cooking gas mixed with air into the cross-flame burner 702. The gas conduit 728 is shown connected to a Venturi body 730. The Venturi body 730 can mix incoming cooking gas with air to provide a fuel air mixture to the cross-flame burner 702.

Figure 8:
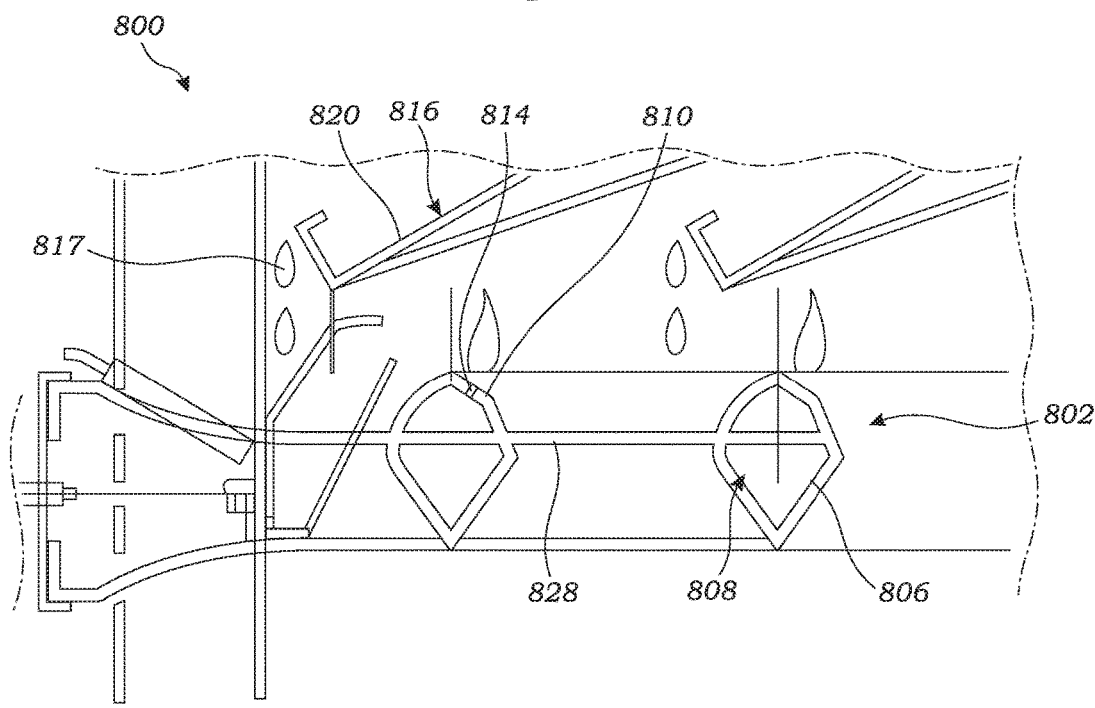
FIG. 8 is an expanded side view of a cross-flame burner system in a fourth embodiment.

Referring now to FIG. 8, therein is shown an expanded expanded side view of a cross-flame burner system 800 in a fourth embodiment. The cross-flame burner system 800 is depicted to include a cross-flame burner 802 including horizontal extensions 806.

The horizontal extensions 806 are depicted having a geometric cross-section 808 with angled walls 810. Along top surfaces 812 of the angled walls 810 of the horizontal extensions 806 are burner ports 814. The burner ports 814 can be directed upward at an angle and can project a flame upward at an angle towards radiant trays 816.

The top surfaces 812 of the horizontal extensions 806 are depicted with the angled walls 810 which has been discovered to better shed grease and oils 817 from the food and keep the burner ports 814 clean and unobstructed by the grease and oils 817. The radiant trays 816 are depicted having an inverted V configuration. The angle of the legs 820 can be seen to follow the angle of the flames emitted from the burner ports 814 for a more even conduction of heat from the burner ports 814 to the radiant trays 816.

It has been discovered that the shape of the radiant trays 816 and the positioning of the radiant trays 816 above the cross-flame burner 802 and specifically the positioning of the radiant trays 816 above the horizontal extensions 806 of the cross-flame burner 802 provide multiple advantages.

One advantage unexpectedly discovered is that as the cross-flame burner 802 projects a flame upward toward the radiant trays 816, the radiant trays 816 will conduct the heat from the flame and evenly re-radiate the thermal energy orthogonally to the surface of the legs 820. Radiating evenly distributed the thermal energy in this way creates areas of evenly distributed and directional thermal energy above the radiant trays 816 that increase the effectiveness of the cross-flame burner 802 during food preparation by eliminating hot and cold spots while requiring a minimal number of the burner ports 814.

Another advantage unexpectedly discovered is that the angle of the legs 820 allows the oils and grease 817 from food to drip down the legs 820 without pooling or collecting on the radiant trays 816. This eliminates flareups from the oils and grease 817 catching fire. The oil and grease 817 is shown dripping down from the radiant trays 816 away from and on the side of the horizontal extensions 806.

A gas conduit 828 is depicted extending longitudinally through center portions of the horizontal extensions 806. The gas conduit 828 can extend perpendicularly thorough the horizontal extensions 806. The gas conduit 828 can transport cooking gas mixed with air into the cross-flame burner 802.

Figure 9:
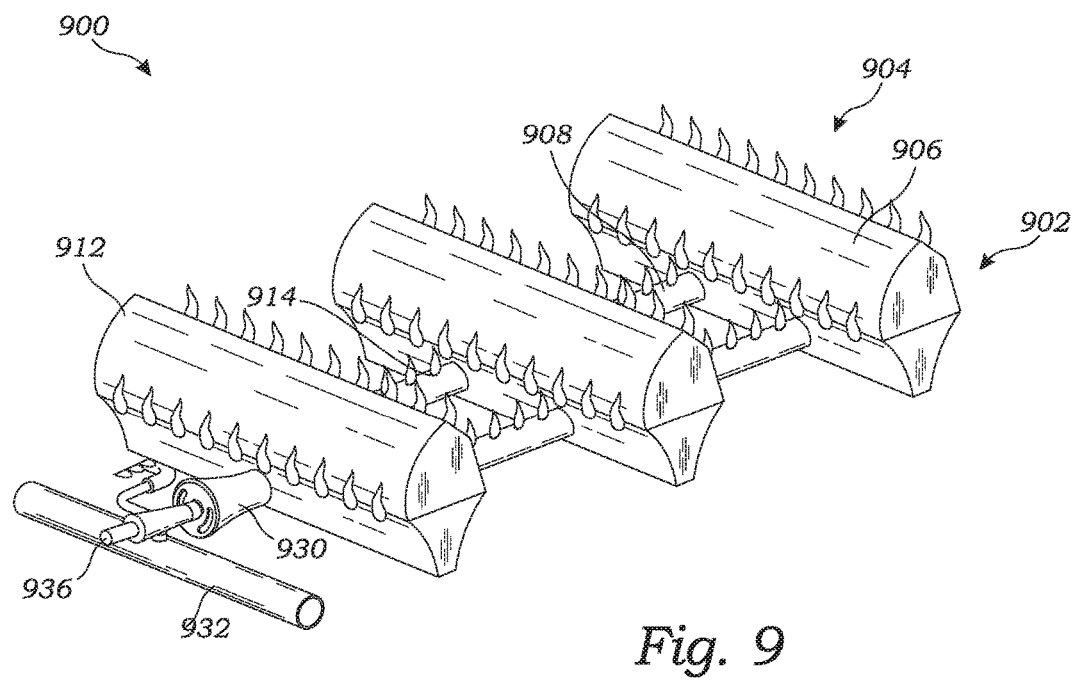
FIG. 9 is an isometric view of a cross-flame burner system in a fifth embodiment.

Referring now to FIG. 9, therein is shown an isometric view of a cross-flame burner system 900 in a fifth embodiment. The cross-flame burner system 900 is shown having a cross-flame burner 902 including a burner body 904 and horizontal extensions 906.

The horizontal extensions 906 extend from a longitudinal portion 908 of the burner body 904. The longitudinal portion 908 can run down the center of the horizontal extensions 906.

Along top surfaces 912 of the longitudinal portion 908 and the horizontal extensions 906 are burner ports 914. The top surfaces 912 of the longitudinal portion 908 and the horizontal extensions 906 are depicted as angled surfaces. Further the horizontal extensions 906 are depicted having a cross-sectional area larger than that of the longitudinal portion 908 for even distribution of cooking gas within the cross-flame burner 902.

The longitudinal portion 908 can extend through the horizontal extensions 906 and transport cooking gas mixed with air into the burner body 904. The longitudinal portion 908 is shown connected to a Venturi body 930. The Venturi body 930 can mix incoming cooking gas from a gas manifold 932 with air to provide a fuel air mixture to the burner body 904. The amount of the gas can be controlled by a valve 936.

Figure 10:
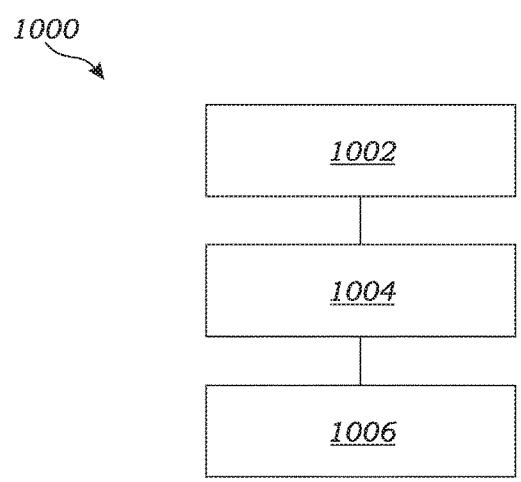
FIG. 10 is a method of manufacturing the cross-flame burner system.

Referring now to FIG. 10, therein is shown a method of manufacturing 1000 the cross-flame burner system. The method 1000 can include: providing a grill body in a block 1002; mounting a cross-flame burner within the grill body, the cross-flame burner including a horizontal extension, a longitudinal portion, and a gas conduit, the horizontal extension extending laterally from the longitudinal section, the cross-flame burner including burner ports within the horizontal extension for providing a flame from a fuel and air mixture from the gas conduit in a block 1004; and affixing a Venturi body to the gas conduit in a block 1006.

Thus, it has been discovered that the cross-flame burner system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the cross-flame burner system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A cross-flame burner system comprising:
   a grill body;
   a cross-flame burner within the grill body, the cross-flame burner includes an arched extension, a longitudinal portion, and a gas conduit, the arched extension extends laterally from the longitudinal section, the cross-flame burner includes burner ports within the arched extension for providing a flame from a fuel and air mixture from the gas conduit, the arched extension extended in a curve vertically up over the gas conduit; and
   a Venturi body affixed to the gas conduit.

2. The system of claim 1 further comprising a grating above the cross-flame burner, the grating having an L shape with a longitudinal surface formed integrally with a vertical surface.

3. The system of claim 1 wherein the burner ports are within a top surface of the arched extension.

4. The system of claim 1 wherein the arched extension is shaped as a bar with a length and a curve along the length.

5. The system of claim 1 wherein the gas conduit extends from an end portion of the cross-flame burner and extends underneath the arched extension.

6. The system of claim 1 wherein:
   the arched extension is a first arched extension; and
   further comprising:
   a grill body;
   a hood covering mounted to the grill body;
   a second arched extension within the grill body, the second arched extension extends laterally away from and perpendicular to the longitudinal section, the second arched extension includes burner ports within the second arched extension for providing the flame from the fuel and the air mixture from the gas conduit; and
   radiant trays within the grill body mounted above the first arched extension and the second arched extension and the radiant trays spaced wholly apart from the first arched extension and the second arched extension.

7. The system of claim 6 wherein the radiant trays include:
   a first radiant tray with a first surface, the first radiant tray above and covers the entire first arched extension; and
   a second radiant tray with a second surface, the second radiant tray above and covers the entire second arched extension, and the first surface is perpendicular to the second surface.

8. The system of claim 6 wherein the radiant trays are shaped as inverted V's with each of the radiant trays having an apex centered between legs.

9. The system of claim 6 further comprising a grating above the cross-flame burner, the grating having an L shape with a longitudinal surface formed integrally with a vertical surface, and the longitudinal surface:
   horizontal and above the vertical surface;
   horizontal and below the vertical surface;
   angled down from the vertical surface; or
   a combination thereof.

10. The system of claim 6 further comprising a longitudinal radiant tray beneath the radiant trays, and the longitudinal radiant tray above and extending along with the longitudinal portion.

11. A method of manufacturing a cross-flame burner system comprising:
   providing a grill body;
   mounting a cross-flame burner within the grill body, the cross-flame burner including an arched extension, a longitudinal portion, and a gas conduit, the arched extension extending laterally from the longitudinal section, the cross-flame burner including burner ports within the arched extension for providing a flame from a fuel and air mixture from the gas conduit, the arched extension extended in a curve vertically up over the gas conduit; and
   affixing a Venturi body to the gas conduit.

12. The method of claim 11 further comprising mounting a grating above the cross-flame burner, the grating having an L shape with a longitudinal surface formed integrally with a vertical surface.

13. The method of claim 11 wherein mounting the cross-flame burner includes mounting the cross-flame burner including the burner ports within a top surface of the arched extension.

14. The method of claim 11 wherein mounting the cross-flame burner includes mounting the cross-flame burner including the arched extension shaped as a bar with a curve along a length.

15. The method of claim 11 wherein mounting the cross-flame burner includes mounting the cross-flame burner including the gas conduit extending from an end portion of the cross-flame burner and extending underneath the arched extension.

16. A method of manufacturing a cross-flame burner system comprising:
   providing a grill body;
   mounting a hood covering to the grill body;
   mounting a cross-flame burner within the grill body, the cross-flame burner including arched extensions, a longitudinal portion, and a gas conduit, the arched extensions extending laterally away from and perpendicular to the longitudinal section, the cross-flame burner including burner ports within the arched extensions for providing a flame from a fuel and air mixture from the gas conduit, the arched extension extended in a curve vertically up over the gas conduit;
   affixing a Venturi body to the gas conduit; and
   mounting radiant trays above the arched extensions and spaced wholly apart from the arched extensions.

17. The method of claim 16 wherein mounting the radiant trays includes:
   mounting a first radiant tray including a first surface, the first radiant tray above and fully covering one of the arched extensions; and
   mounting a second radiant tray including a second surface, the second radiant tray above and fully covering another one of the arched extensions, and the first surface is perpendicular to the second surface.

18. The method of claim 16 wherein mounting the radiant trays includes mounting the radiant trays shaped as inverted V's with each of the radiant trays having an apex centered between legs.

19. The method of claim 16 further comprising mounting a grating above the cross-flame burner, the grating having an L shape with a longitudinal surface formed integrally with a vertical surface, and the longitudinal surface:
   horizontal and above the vertical surface;
   horizontal and below the vertical surface;
   angled down from the vertical surface; or
   a combination thereof.

20. The method of claim 16 further comprising:
   affixing a longitudinal radiant tray beneath the radiant trays; and
   mounting the longitudinal radiant tray above and extending along with the longitudinal portion.

* * * * *